US012561761B2

(12) United States Patent
Bigos et al.

(10) Patent No.: US 12,561,761 B2
(45) Date of Patent: Feb. 24, 2026

(54) PROGRESSIVE REFINEMENT VIDEO ENHANCEMENT

(71) Applicant: Sony Interactive Entertainment Europe Limited, London (GB)

(72) Inventors: Andrew James Bigos, London (GB); Daniel Montero Motilla, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 268 days.

(21) Appl. No.: 18/487,516

(22) Filed: Oct. 16, 2023

(65) Prior Publication Data
US 2024/0144436 A1 May 2, 2024

(30) Foreign Application Priority Data

Oct. 19, 2022 (GB) ...................................... 2215455

(51) Int. Cl.
| *G06T 5/50* | (2006.01) |
| *H04L 45/00* | (2022.01) |
| *H04L 65/80* | (2022.01) |

(52) U.S. Cl.
CPC ............... *G06T 5/50* (2013.01); *H04L 45/22* (2013.01); *H04L 65/80* (2013.01); *G06T 2207/10016* (2013.01)

(58) Field of Classification Search
CPC . G06T 5/50; G06T 2207/10016; H04L 45/22; H04L 65/80; H04N 21/2402;
(Continued)

(56) References Cited

U.S. PATENT DOCUMENTS 9,210,302 B1 12/2015 Holmer et al.
2004/0261113 A1* 12/2004 Paul ............... H04N 21/234327
725/135
(Continued)

FOREIGN PATENT DOCUMENTS

EP 1271954 A2 1/2003
JP 2001119702 A * 4/2001
(Continued)

OTHER PUBLICATIONS

Combined Search and Examination Report for UK Patent Application No. 2215455.3 issued Apr. 27, 2023, from the UK Patent Office.
(Continued)

*Primary Examiner* — Mekonen T Bekele
(74) *Attorney, Agent, or Firm* — Fish & Richardson P.C.

(57) ABSTRACT

A method and system for improving a resolution of an image frame is described. The image frame is part of a data stream. The data stream may be a video game, for example. The method comprising the following steps. Sending an encoded version of the image frame from a server to a client device via a first communication channel between the server and the client device. Detecting a reduced bandwidth of the first communication channel. In response to detecting the reduced bandwidth, determining data to be sent to the client device via a second communication channel. The second communication channel is separate to the first communication channel and the data relates to the image frame. The determined data is sent via the second communication channel.

20 Claims, 4 Drawing Sheets

(58) Field of Classification Search
CPC ......... H04N 21/234363; H04N 21/631; H04N
21/234327; H04N 21/2385; H04N
21/2662; H04N 21/440227; H04N
21/44209; H04N 21/64738
See application file for complete search history.

(56) References Cited

U.S. PATENT DOCUMENTS

| | | | |
|---|---|---|---|
| 2009/0252425 A1 | 10/2009 | Bruls et al. | |
| 2014/0146883 A1 | 5/2014 | Zhang et al. | |

FOREIGN PATENT DOCUMENTS

| | | | | | |
|---|---|---|---|---|---|
| KR | 20170094745 A | * | 8/2017 | ............. | H04N 7/147 |
| WO | WO-9935853 A1 | * | 7/1999 | ............... | H04N 5/92 |
| WO | WO 2002052860 A1 | | 7/2002 | | |

OTHER PUBLICATIONS

Extended Search Report issued from the European Patent Office for related EP Patent Application No. 23204438.8, on Dec. 4, 2023.

\* cited by examiner

100
105
110
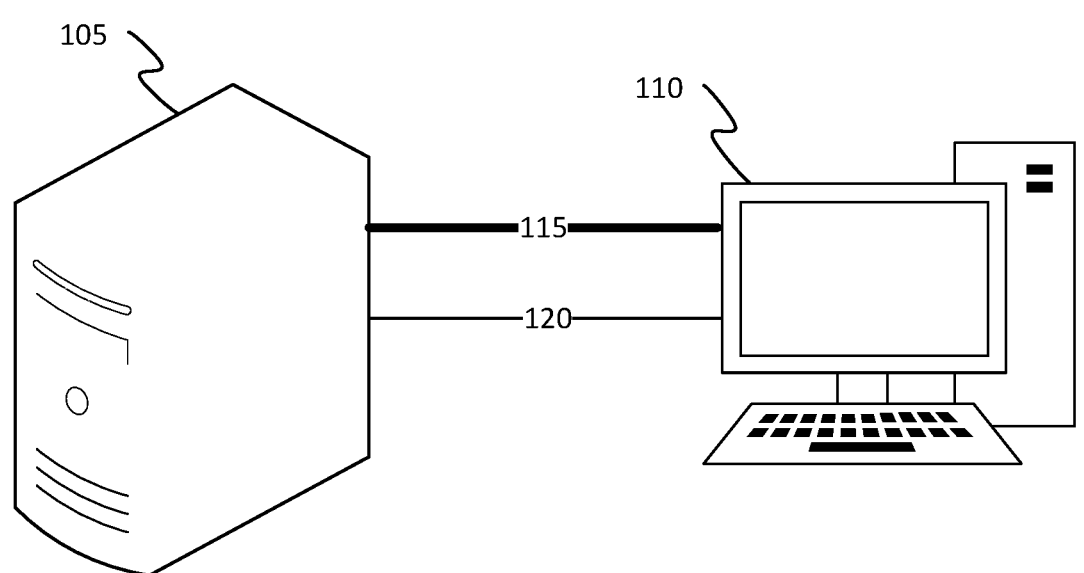
115
120
<u>Figure 1</u>

300

310 — Send an encoded image frame from server to client device via first communication channel 320 — Detect reduced bandwidth of first communication channel 330 — Determine data to be sent from server to client via second communication channel 340 — Send data to client via second communication channel

PROGRESSIVE REFINEMENT VIDEO ENHANCEMENT

CROSS-REFERENCE TO RELATED APPLICATIONS

The present application claims priority from British Patent Application No. 2215455.3, filed 2022 Oct. 19, the contents of which are incorporated herein by reference in its entirety.

FIELD

The present disclosure relates to a system and method for progressive refinement of a video frame. In particular, the present disclosure relates to a system and method for improving a resolution of an image frame when a streaming bandwidth of the system is reduced.

BACKGROUND

During a video game, a user often comes to a rest either in the game itself or via the game system pause. With a traditional streaming system, a paused image displayed on a screen to a user/player of the game would represent the last frame decoded at the client and could for example contain streaming artefacts. When the streaming bandwidth is reduced because the image is not changing (i.e. because the image frame displayed is static or changes very little from frame to frame and no further information is being sent to the client device) it can be helpful to allocate that streaming bandwidth to other resources to enhance the final image (i.e. the image being displayed by the client device).

A feature of image compression systems is that they can provide gradual refinement of an image. An initially crude image can be refined over time by the addition of 'residuals' which represent deltas between the current image and a more accurate representation. Residuals can be sent when the video game is paused, or the delta content for each streamed frame is very low. In this case it is desirable to use all the available streaming bandwidth to enhance the paused or nearly stationary image.

Providing information to the client to enhance the image might be done by changing the parameters of the codec in the streaming system. However, this is not ideal as it requires some changes (such as changes to resolution) which might involve sending more data across the system to synchronise the stream. Rapid changes of the streaming parameters can cause unpredictable changes in streaming bandwidth which are not desirable, and the system may take a while to adapt to the change.

An aim of the present disclosure is to provide a method for gradually improving the image without increasing the streaming bandwidth, and which is more efficient than existing techniques.

SUMMARY

According to a first aspect, there is provided a method performed by a server for improving a resolution of an image frame. The image frame is part of a data stream. The data stream may be a video game, for example. The method comprises the following steps. An encoded version of the image frame is sent to a client device via a first communication channel between the server and the client device. A reduced streaming bandwidth of the first communication channel is detected. In response to detecting the reduced streaming bandwidth, data to be sent to the client device via a second communication channel is determined, wherein the second communication channel is separate to the first communication channel, and the data relates to the image frame. The determined data is sent to the client device via the second communication channel.

The first communication channel is a channel that data is sent over in a first state and a second state. Data can be sent over the second communication channel is a second state but not in the first state. The first state may comprise a "play" state, for example comprising data relating to an image stream, the data being transferred from the server to the client at a high streaming bandwidth. The second state may be a "pause" or low streaming bandwidth state, where data sent between the server and the client is reduced compared to the first state and may relate to a static or nearly static image. The data to be determined may include residual information to be sent to the client to progressively improve the image at the client device. Residual information represents deltas between the current image displayed at the client device and a more accurate representation, for example as generated by the server. The data sent to the client device may also include control information, for example describing how the residual information is to be used at the client device.

Advantageously, by sending data to the client via a second communication channel when the streaming bandwidth is reduced due to reduced data transfer between the server and the client device, the image can be progressively enhanced and there is no need for the first communication channel to be reconfigured to send the data for the enhancement over this channel. The data sent to the client from the server can include residual information for improving the image and can be sent via a separate streaming channel. The streaming parameters of the first communication channel do not need to be changed. This provides a dynamic system that can adapt quickly to the streaming state and that has the possibility to provide data to the client for any duration, including for just a few seconds. Flexibility is provided by responding to a change in streaming bandwidth detected over the first communication channel.

In some embodiments, detecting the reduced streaming bandwidth may comprise determining that the streaming bandwidth is below a predetermined threshold. An example predetermined threshold may be a percentage of the total available streaming bandwidth. The predetermined threshold may be detected by the system. By actively detecting the reduced streaming bandwidth, the system can adapt quickly to changing conditions and send additional data via the second communication channel, which is separate to the first communication channel. The predetermined threshold may vary in some examples and may for example depend on the characteristics of the video codec being used.

In some embodiments, the method may further comprise detecting that the streaming bandwidth has increased above the predetermined threshold (i.e. that an amount of data being sent between the server and the client device has increased above the predetermined threshold); and discontinuing to send the data via the second communication channel. When the system returns to a first state (i.e. where data is being sent across the first communication channel in high volumes, e.g. relating to an image stream), the second communication channel can stop sending information to the client. For example, when the streaming bandwidth is needed to send the data via the first communication channel, use of the second communication channel can be discontinued. If the streaming bandwidth drops again, the second communication channel can be used then.

In some embodiments, detecting the reduced streaming bandwidth may comprise receiving a signal from the client device. A signal may comprise a message, for example that a pause has been affected at the client device. A pause signal is indicative that the streaming bandwidth (i.e. data transfer) across the first communication channel is reduced because the image displayed is static so data comprising the encoded version of the image send via the first communication channel is paused.

In some embodiments, the method may further comprise sending the data in response to a trigger. The trigger may include a signal or message from the client device or the server.

In some embodiments, the method may further comprise determining a local copy of a reconstructed image frame which is representative of an image frame determined at the client device. By determining a local copy of the image as it will be reconstructed at the client device, the server can compare between the original and reconstructed images and determine the data to be sent to the client to enhance the image. The data can be determined as a number of residuals to be sent to the client. The residuals may be sent to the client in one message or may be sent at intervals, for example depending on the streaming bandwidth and the size of the residuals to be sent.

In some embodiments, the method may further comprise determining the data based on a difference between a high-resolution version of the image and the local copy of the reconstructed image frame. The high-resolution version of the image may be generated at the server. Information about this image can be lost in the transmission from the server to the client and the encoding/decoding process. The data which is sent to the client device may help to enhance the image to increase the similarity between the image at the client device and the high-resolution image generated at the server. Advantageously, the data can be determined at the server based on the high-resolution image generated and available to the server and a copy of the image as it would be received and processed at the client device by locally reproducing this image at the server.

In some embodiments, the data may be sent via one or more data packages. In some examples, residual information to be sent to the client may be large and so it may be beneficial to send the data to the client in a number of smaller data packages. A first data package may be sent which enhances the image the most compared to the other data packages. In one embodiment, the one or more data packages can be sent at the same time as each other. In another embodiment, the data packages can be sent at intervals.

In some embodiments, the determined data may be provided as one or more data packages based the streaming bandwidth and/or a magnitude of the difference between the high-resolution version of the image frame and the reconstructed image frame. For example, the size of the data packages may be determined based on the streaming bandwidth and/or the magnitude of the difference.

According to a second aspect, there is provided a method performed by a client device for improving a resolution of an image frame. The second aspect may be reciprocal to the first aspect, for example relating to the method described in the first aspect as performed at the server. The image frame is part of a data stream, for example a video stream. The method at the client device comprises the following steps. An encoded version of an image frame is received from the server via a first communication channel. The encoded version of the image frame is decoded at the client device. Data relating to the image frame is received from the server via a second communication channel. The data which is sent is obtained in response to a reduced streaming bandwidth of the first communication channel being detected. The second communication channel is separate to the first communication channel. Data from the second communication channel is combined with the decoded image frame received via the first communication channel to improve the resolution of the image frame. The image frame is displayed, for example at a display device which is part of/connected to the client device.

Advantageously, the client device seamlessly and dynamically receives data concerning an image/image stream to be displayed at the display device. In a first state, this information relates to an encoded version of an image frame (or an image stream) and in a second state the information relates to enhancements that can be made to an image frame. The client device does not need to be reconfigured to receive information differently between the two states. The image to be displayed can be progressively enhanced in the second state, for example when the image is paused or relatively static. A user watching the display device may not notice that the image is being progressively enhanced.

In some embodiments, the reduced streaming bandwidth can be detected by determining that the streaming bandwidth is below a predetermined threshold. In one example, the client device may monitor the streaming bandwidth available on the first communication channel.

In some embodiments, the client device may send a signal to the server in response to detecting a reduced streaming bandwidth. The reduced streaming bandwidth may be detected at the server in response to sending a signal. In one example, the client device may send a message to the server, for example indicative of a state of play (e.g. that a game/video stream is paused).

In some embodiments, the data may be determined based on a difference between a high-resolution version of the image frame and a version of the displayed image frame. The high-resolution version of the image may be generated at the server and received at the client device. Information about this image can be lost in the transmission from the server to the client and the encoding/decoding process. The data which is sent to the client device may help to enhance the image to increase the similarity between the image at the client device and the high-resolution image generated at the server.

In some embodiments, the data may be obtained via one or more data packages. In some examples, data (e.g. residual information) to be received at the client may be large and so it may be received in a number of smaller data packages. A first data package may be received first, where the first data package enhances the image the most compared to the other data packages. In one embodiment, the one or more data packages can be received at the same time as each other. In another embodiment, the data packages can be received at intervals. This may be based on the amount of data to be sent and/or the streaming bandwidth for sending the data.

In some embodiments, the data packages may be determined based on the streaming bandwidth and/or a magnitude of the difference between a high resolution version of the image frame and a reconstructed image frame. For example, the size of the data packages may be determined based on the available streaming bandwidth.

In some embodiments, each data package which is received at the client device may progressively improve the displayed image frame at the client device.

In some embodiments, the first communication channel comprises a codec. A codec is a device or software (e.g. a computer program) for encoding and decoding a digital data stream.

According to a third aspect, there is provided a computer program product including one or more executable instructions which, when executed by a computer, causes the computer to carry out the method according to the first and second aspects.

According to a fourth aspect, there is provided a system. The system comprises: a server configured to carry out the method according to the first aspect; and a client device or computing device comprising a processor and memory. The client device and the server are operably connected by a communication network. The client device is arranged and configured to carry out the method of the second aspect.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures.

FIG. 1 illustrates a schematic representation of a system according to an embodiment of the present disclosure;

DETAILED DESCRIPTION

Figure 2:
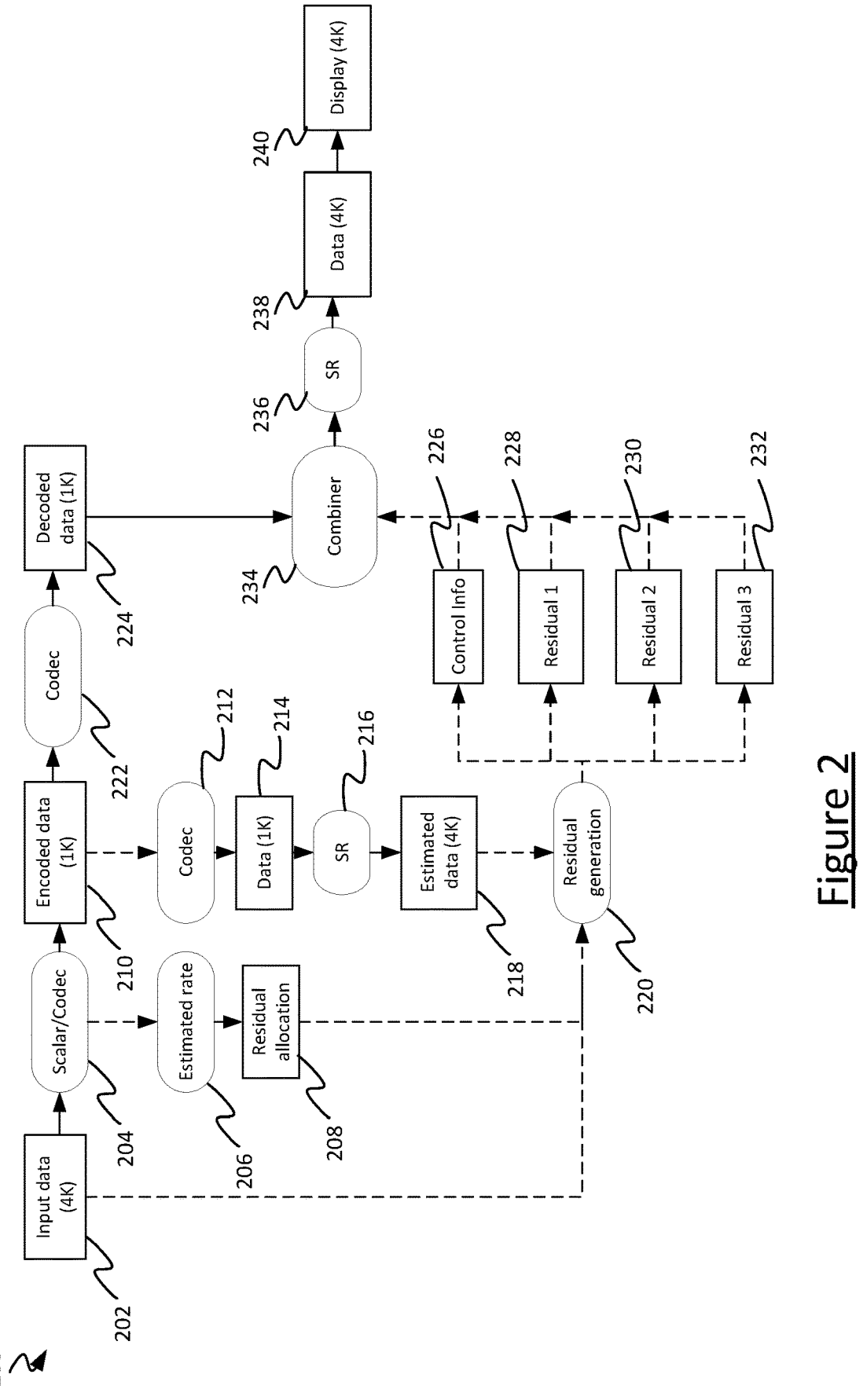
FIG. 2 illustrates a further schematic representation according to an embodiment of the present disclosure.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

An aim of the present disclosure is to provide a method that requires minimal changes to the active system when a reduced streaming bandwidth is detected, and which can be used to enhance an image displayed to a user for a few seconds or more while the user pauses the game/image stream. The image could be improved to a greater extent than is possible using a standard codec; a system is created that is independent of a specific codec. When the decoded image of the present disclosure goes through a process to enhance the final image, the presently described method provides additional data to the enhancement process to improve the quality beyond what would normally be possible.

The present disclosure limits the streaming bandwidth allocated to enhancement and allows the streaming of side-channel residual information which can effectively increase the resolution (or bitrate) of the output image by continu-ously adding more information (in a similar way to how a progressive refinement of a static image works).

This may be particularly useful in video game applications as the native game may run at a high resolution, such as 4K resolution, while the game is streamed at a much lower resolution, such as at 1080p, which means that the system has access to the high-resolution information which can be streamed to enhance the base 1080p image received at the client. The process has been shown to work with super resolution (SR) very well and can be used to increase the performance of SR as well.

When the streamed bandwidth of the codec in the streaming system is reduced below a certain threshold, additional information is streamed in a side channel which can be used to enhance the image. The codec may be referred to herein as a first communication channel and the side-channel may be referred to as a second communication channel. 'Spare' streaming bandwidth made available by reduced data being sent by the codec (i.e. the first communication channel) is used to stream additional information that can be used to enhance a frame of image data. This method of sending the information via a separate communication channel is preferable to changing the streaming codec parameters (i.e. of the first communication channel) because this is a relatively heavyweight operation which can cause fluctuation in streaming bandwidth, and which is difficult to achieve for short periods of time. The present disclosure can give an effective boost in image quality with no increase in streaming bandwidth and can achieve this very dynamically.

An architecture for achieving an improved image quality for a short amount of time comprises a side channel (i.e. a second communication channel) for sending residual information through to enhance a base image which is separate to the codec (i.e. the first communication channel). The quality of a streamed base image can be improved by sending multiple residual images which can be combined with the current image (e.g. base image) to slowly improve its quality. Unlike known methods the present disclosure provides a method which is only active when the mainstream is paused and/or the streaming bandwidth is low, for example very low.

Enhancement data sent via the second communication channel can be combined with the encoded image sent via the first communication channel at the input of the SR process, rather than after the SR process. Additional state information on the client side can be sent to the server to accumulate more detail over a number of frames so while the image is paused it is possible to keep enhancing the image until the output SR image effectively matches the rendered high-quality image at the server.

FIG. 1 illustrates a schematic representation of a system 100 according to an embodiment of the present disclosure. The system 100 comprising a server 105, a client device 110, a first communication channel 115 and a second communication channel 120. The system 100 provides a dynamic method for improving image quality based on available streaming bandwidth.

The server 105 may be physical and/or virtual and may comprise one or more server devices. The client device 110 may be a personal computer (PC), a tablet computer, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein. The computing device comprises a display device for displaying an image or image stream.

The first and second communication channels 115, 120 may be wired and/or wireless communication channels for sending data between the server 105 and the client device 110. For example, the communication channels 115, 120 may communicate via WiFi.

Information can be sent between the server 105 and client 110 via the first and second communication channels 115, 120 in either direction. However, in one example, the second communication channel send signals from the server 105 to the client 110 in a single direction only. The first and second communication channels 115, 120 may have a combined total allocated streaming bandwidth for sending information therebetween.

The system 100 illustrated in FIG. 1 is operable in two states. A first state is operable when an available streaming bandwidth between the server 105 and the client 110 over the first communication channel 115 is low (i.e. data transfer between the server 105 and client 110 is high). A second state is operable when data being streamed over the first communication channel 115 is relatively lower compared to the first state. According to the first state, information is sent via the first communication channel 115 and in the second state information is sent via the first and second communication channels 115, 120. The first state may be "normal" playback, such as when a scene being displayed at the client device that is changing rapidly. The second state may be "paused" or more static scene, where the image is not changing very much for a duration of time.

The first state operates during periods of high performance at the client 110, for example when little to no streaming bandwidth is available for transmitting additional data between the server 105 and the client 110. High performance periods include continuous data streaming scenarios such as provision of an image stream to a display at the client 110 (e.g. when a game is being played, or when a video is being shown continuously). During these periods, data is transmitted from the server 105 to the client 110 via a first communication channel 115 and less data (or no data) is sent to the client via the second channel 120.

The second state operates when some bandwidth between the server 105 and the client 110 becomes available as detected by the system 100. The system 100 detects changes in the streaming bandwidth and associated availability between the server 105 and the client 110 to switch the system 100 into the second state where information is sent to the client via both the first and second communication channels 115, 120. Detection may be through active monitoring of streaming bandwidth and availability through the first channel 115, or through other means such as through messages and/or signals received at the server 105 from the client 110. In one example, the system 100 can be controlled by monitoring a threshold value of the measured streaming bandwidth between the server 105 and the client 110, for example a predetermined threshold value. In another example, control signals are sent. Such signals may include information concerning an action performed by a user that is watching the image stream displayed at the client 105. In one example, a signal is sent when a user presses a pause button to freeze (or pause) the display at a single frame of the image stream. The signal may for example be a message, a control signal, or a flag. A signal can be sent between the server 105 and the client 110, for example to indicate an availability of streaming bandwidth on the first communication channel 115 and/or the second communication channel 120. The signal indicates that the video stream is paused. In some examples, the control signal is sent via the first communication channel 115. In another example, a neural network may be trained to monitor the data stream for available streaming bandwidth, pause signals and/or any other indication that streaming bandwidth may be available.

Based on the information sent between the server 105 and the client 110, for example concerning the streaming bandwidth, the system 100 can dynamically change what data is sent from the server 105 to the client 110. To determine the additional information to be sent to the client 110 at the server 110 via the second communication channel 120 in the second state, a method can be performed, preferably at the server 110. The determination can be based on streaming bandwidth between the server 105 and the client 110 and a local server estimation of the process which is performed at the client 110 to up-scale the image. In one example, the data is sent in the form of residual information calculated from a delta between the high-resolution image generated and the lower resolution image displayed (a replica of the displayed image can be generated at the server 105). The number of residuals sent from the server 105 to the client 110 can be based on the streaming bandwidth. A first residual may be sent which will have the most significant change (i.e. improvement) on the image reproduced at the client 110. If a plurality of residuals is to be sent, the residuals can be sent in order of descending improvement of the image, with the data relating to a most significant improvement being sent first.

At the server 105 a copy of an encoded version of the image which arrives at and is processed by the client 110 can be reproduced, for example including post processing techniques performed at the client 110 such as SR. This provides the server 105 with an accurate representation of what is received and processed by the client 110 and allows differences between the image generated by the server 105 and the image reproduced at the client 110 to be determined. The difference can be calculated by subtracting the copy of what is reproduced at the client 110 from the original, high-resolution image. Residual information can be determined from this difference. Using this residual information, it is possible to provide information to the client 110 such that the client device can display an image frame which is closer to the original, high-resolution image generated by the server 105. The difference in some examples is split into multiple residuals before being sent to the client 120 via the second communication channel 120. Residuals sent to the client 110 progressively improve the image at the client 110. These residuals can be combined with further information at the client device 110. In some examples, residuals that have arrived at the client 110 from the server 105 can be tracked. Tracked residuals may be reported back to the server 105.

The image quality achievable by this process is higher than can be achieved by codec alone (i.e. the information that is sent via the first communication channel 115). The codec (of the first communication channel 115) can be bypassed to send more information for a brief period of time. The presently described method provides quick adaptation to improve image quality and offers improved and flexible dynamic resolution, for example on a frame-by-frame basis compared to methods which change the codec.

FIG. 2 illustrates a system 200 according to an embodiment of the present disclosure which is implemented by the system 100 as described above. This system 200 comprises server side and client side components.

Components of the server illustrated in FIG. 2 comprise input data 202 (generated at an example resolution of 4K at the server), a scalar/codec module 204, an estimated rate module 206, a residual allocation module 208, encoded data 210 (generated by the scalar/codec module 204 and having an example resolution of 1K), a codec 212 (for decoding encoded data 210 output from scalar/codec module 204), estimated decoded data 214 (at an example 1K resolution), a Super Resolution (SR) module 216, estimated data 218 output from the SR module 218 (at an example 4K resolution), and a residual generation module 220. The server modules may be hardware and/or software or a combination of the two. In some examples, the server may be in part cloud based.

Components of the client device illustrated in FIG. 2 comprise a codec 222 (which receives encoded data 210 from the server), decoded data 224 (at an example resolution of 1K and decoded by the codec 222), a combiner module 234 for combining information received at the client device via the first and second communication channels from the server, an SR module 236, upscaled data 238 (at 4K resolution output from the SR module 236) and a display 240 which displays the image frame to a user at high resolution (4K).

The system 200 illustrated in FIG. 2 operates in two states, where a first state is operable when a streaming bandwidth between the server and the client over a first communication channel is high, and a second state which is operable when the streaming bandwidth over the first communication channel is detected as being relatively lower compared to the first state. The route of information flow through the system 200 in a first state is indicated with solid arrows. An additional data route through the system 200, when the system 200 is operating in the second state, is illustrated in FIG. 2 with dashed arrows. The function of first and second states are described above in relation to FIG. 1.

The aim of the method carried out by the system 200 is to replicate the high-resolution image/frame (which is generated at the server) as closely as possible at the display 240 of the client device. It is impractical to send the input data 202 straight to the client device because this would require a very large streaming bandwidth which is not usually available. To overcome this problem, the high-resolution image generated at the server is encoded at the server, e.g. at a scalar/codec module 204, and sent as encoded data 210 to the client. The encoded data 210 is decoded at the client and displayed at the display 240. Some information is lost in this encoding-decoding process. Post processing can help to recover this information. In some examples, a Super Resolution (SR) process upscales the decoded data 224 from the low-resolution image (e.g. 1K) decoded at the client to high resolution image data (e.g. 4K) 238 to be displayed at the display 240.

According to the first state, data is sent from the server to the client via a first communication channel. The first communication channel between the server and the client of FIG. 1 is illustrated in FIG. 2 by the solid arrows. When there is little to no extra streaming bandwidth available, i.e. when a streaming bandwidth is above a predetermined threshold, input data 202 is transmitted to the client device from the server in a first state via the first communication channel which flows from the scalar/codec module 204, through to the client side codec 222.

As illustrated in FIG. 2, during first state operation, input data 202 is generated at the server. The input data 202 may be data comprising information for generating an image stream comprising a plurality of image frames. For example, the data input 202 may have a high resolution of 4K. Input data 202 is transmitted to a scalar/codec module 204 at the server and encoded data 210 is output from the scalar/codec module 204 and sent from the server via a first communication channel to codec 222 at the client.

Via the first communication channel, the client receives encoded data 210 from the server at codec 222 and decodes the encoded data 224 at 1K resolution. The decoded data 224 is input to a combiner module 234. The combiner module 234, in the first state primarily receives information from the first communication channel. In the first state, the streaming bandwidth is above a predetermined threshold. For example, the first communication channel may be operating near total capacity.

From the combiner module 234, data is sent to the SR module 236. Data processed at the SR module 236 is output as high-resolution data 238 (e.g. at 4K resolution). This high-resolution data 238 is sent to a display 240 at 4K resolution.

According to a second state, additional information is sent through the system 200. Data may still be sent via the first communication channel as described above.

To improve the image displayed at the display device 240 when the image is frozen/paused at the client, additional information can be sent via a second communication channel and combined with the decoded data at the client, for example at the combiner module 234 located at the client. This information and other data are communicated to the client via the second communication channel when the system is operating in the second state.

In the second state, the input data 202 can be duplicated across the first and second communication channels. Input data 202 comprises full resolution image/frame data which is part of an image stream, and which is generated by the server to be displayed at the client.

The data for sending via the second communication channel is generated at the server, e.g. at a residual generation module 220. The system 200 will start to send residuals 228, 230, 232 for each frame which the combiner module 234 on the client side will use to improve the image. Control information 226 can also be sent to the client and is used to control how the residuals are combined with the base image at the client, e.g. at the combiner module 234.

Generation of the additional information (including residuals and control information) is performed at the server, for example using the input data 202. To calculate the residuals, the server compares the server generated image to an estimation of the image as displayed at the client (i.e. post encoding/decoding and post processing of the image data sent from the server). In some examples, a replication of the image processing performed at the client is performed at the server to determine a local copy of the image that would be displayed at the display 240. To achieve this, an output of encoded data 210 output by the scaler/codec module 204 (to be sent to the client over the first communication channel) can be received as encoded data at codec 212. This may be the same as the encoded data 210 which is received at codec 222 based at the server. At the server side, codec 212 outputs data as decoded data 214 (e.g. at 1K resolution). The decoded data 214 is processed by a super resolution module (SR) 216 to increase the resolution of the frame back up to the original input data resolution of 4K. An output from the super resolution (SR) module 216 provides estimated data 218 at a resolution of 4K, which approximates the image as it would be reproduced at the client. This estimation comprising the calculated estimate data 218 is input to the residual generation module 220 for determining residuals which will improve the image.

In some examples, streaming bandwidth is monitored at the server. An estimated rate module 206 receives information from the scalar/codec module 204. From the estimated rate module 206, data is output to a residual allocation module 208. An output from the residual allocation module 208 goes to the residual generation module 220. Together, the estimated rate module 206 and the residual allocation module 208 form a rate estimator. The rate estimator can detect streaming bandwidth between the server and the client, for example it may detect that a very low amount of data being transmitted from the server to the client over the first communication channel in one example. In another example, the rate estimator is told that the game is paused, for example by signals received from the client. If and/or when the rate estimator comprising the estimated rate module 206 and the residual allocation 208 detects that the streaming bandwidth falls below a predetermined threshold it sends a signal to the residual generation module 220.

A signal received at the residual generation module 220 from the rate estimator causes the residual generation module 220 to calculate a residual (or several residuals). The residual generation module 220, which is located at the server, calculates these residuals 228, 230, 232 and/or determines control information 226 to be transmitted via the second communication channel to the client device in response to the signal.

The residual generation module 220 takes as input: input data at a 4K resolution from the input data module 202, a signal from the rate estimator comprising the estimated rate 206 and residual allocation 208, and estimated data at 4K resolution 218 which represents a version of the frame as it would be processed at the client (without additional residual information).

The residual generation module 220 outputs control information 226 and a first residual 228, along with optional additional residuals such as residual two 230 and residual three 232 as illustrated in FIG. 2. It will be appreciated that any number of residuals may be output from the residual generation module 220. The control information 226 and residuals one to three 228, 230, 232 are output to a combiner module 234 at the client device. A first residual 228 may comprise comparatively more information compared to subsequent residuals and may improve the image displayed at the client by the most significant margin compared to subsequent residuals. In one example, e.g. depending on the streaming bandwidth, a plurality of residuals are sent at once. In another example, one residual is sent at a time across the second communication channel.

Whilst in FIG. 2 only three residuals are illustrated, any number of residuals n may be sent from the residual generation module 220 to the client. This may for example depend on the streaming bandwidth and/or a length of time in which the system is in the second state for.

FIG. 2 and the corresponding description above describes the server doing a decode and SR operation to calculate a replica of the image processed and displayed at the client. However, a neural network could alternatively be used to approximate the output image to allow the residual to be calculated.

In the second state, the combiner module 234 at the client device receives additional inputs to when the system is operating in the first state. These inputs are also received from the server side, but are sent via the second communication channel. The inputs comprise control information 226 and residuals 228, 230, 232. Combiner module 234 combines this information with the decoded data 224 received via the first communication channel before it is output to SR module 236. Importantly, the SR module 236 at the client device receives the combined information, rather than the additional information being used to process the image after SR processing. This may improve the performance of the SR itself. The system 200 works best when coupled with super resolution, as opposed to other techniques, as the residuals 228, 230, 238 will effectively be used to improve the quality of the SR approximation (the SR may need to be adapted for this).

The image data 238 that is output from the SR module 236 is different to the estimated data 218 at the server, which is estimated on the decoded data 214 only (i.e. without the information which is determined at the residual generation module 220).

In the example architecture illustrated in FIGS. 1 and 2 and as described above, a game client in operation renders an image stream at 4K resolution with the streaming system configured to stream a 1K resolution image to the client. It will be appreciated that these resolutions are an example only and are not intended to be limiting to the present disclosure. At the client, the 1K image is post processed at an SR unit 236 to bring the final display up to the desired 4K. When a rate estimator detects very low streaming bandwidth, or it is told that the game is paused, a signal can be sent to a residual generation module 220 to calculate a residual (or residuals) of the input image from the expected decoded image. The residual generation module 220 transmits these residuals 228, 230, 232 on the stream or via the second communication channel, optionally along with control information. The client side stores the last 1K decoded image in a combiner module 234 and passes the decoded 1K image 224 along with residuals 228, 230, 232 to the SR module 236 to up-sample the image to 4K.

When a next frame is detected in the estimator (comprising estimated rate module 206 and residual allocation module 208) it decides to either invalidate the residual 228 or continue to refine the image. In the latter case a new residual can be calculated that will enhance the image currently in the combiner module 234. This additional residual 230 is streamed and provided as input to the system along with the previous residual 228. This refinement process can continue until the SR unit 236 is doing almost no work as the data sent represents the input 4K image.

The advantages of the above systems 100, 200 is that differences in frames can be detected and improvements can be sent to the client dynamically without heavyweight operations having to be performed. The capacity of the system 100, 200 is increased without having to change the codec, which is achievable by sending information via a second communication channel. A detection module measures the capacity of the system 100, 200 and instructs the method accordingly.

Figure 3:
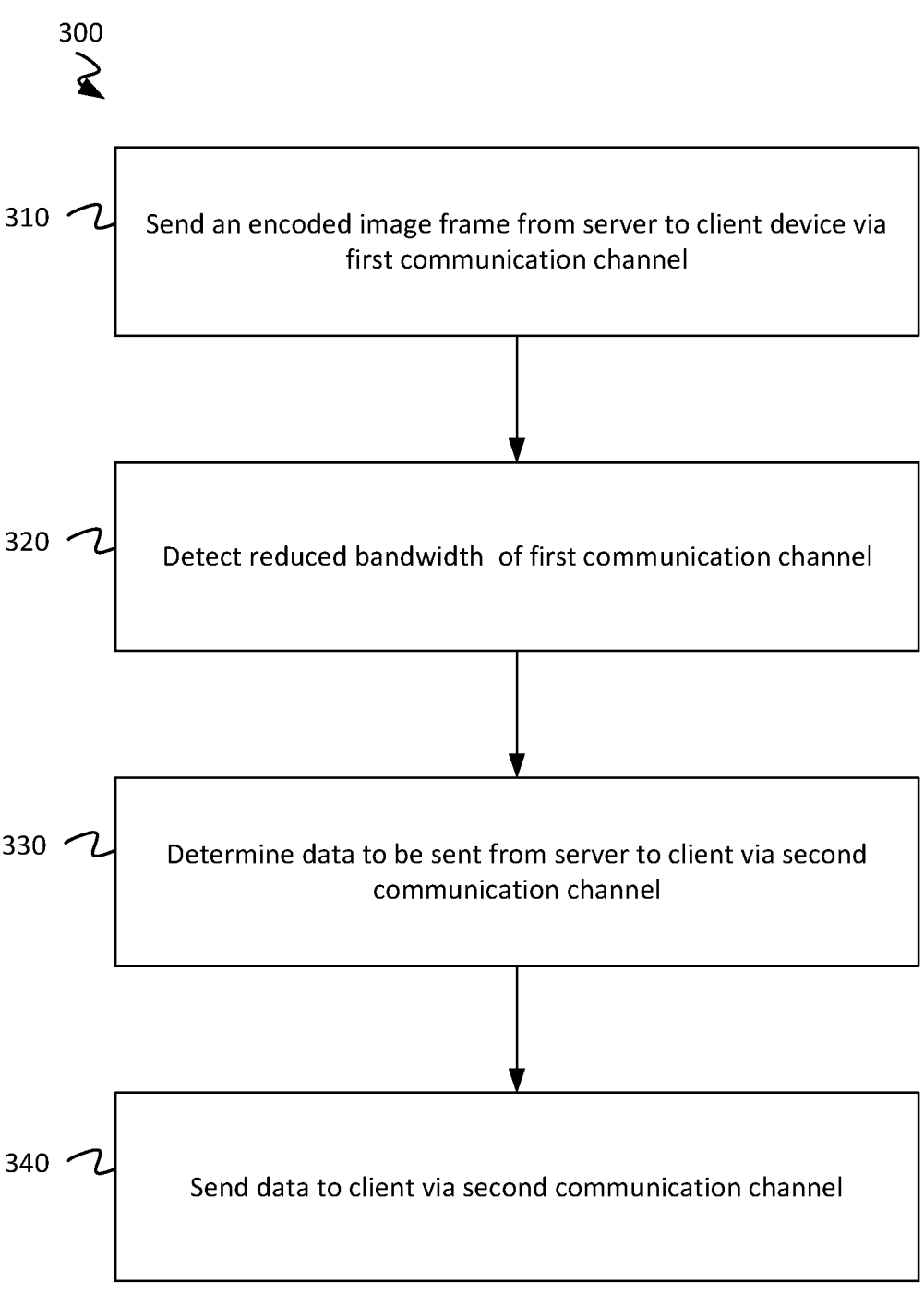
FIG. 3 illustrates a flow diagram of a method according to an embodiment of the present disclosure.

FIG. 3 illustrates a flow diagram of the method 300 carried out between a server and a client according to an embodiment of the present disclosure for progressive refinement of an image. The systems 100, 200 of FIGS. 1 and 2 are configured to perform the method 300.

According to a first step 310 an encoded image frame is sent from a server to a client device via a first communication channel. The first step is performed at a server and the first communication channel transmits data between the server and the client device. In some examples, the first communication channel is a codec.

According to a second step 320 a reduced data transfer (streaming bandwidth) of the first communication channel is detected. In one example, a change in streaming bandwidth is detected by monitoring the traffic over the first communication channel. For example, it may be detected that the streaming bandwidth has fallen below a predetermined threshold. The detection may be calculated at the server and/or the client device. In another example, the reduced streaming bandwidth is detected by receipt of a signal at the server, for example from the client device. The signal can be sent in response to a trigger, for example as a result of a user's action at the client device (e.g. to pause the image stream).

According to a third step 330 data is determined to be sent to the client via a second communication channel. The second communication is separate and different to the first communication channel. It may only be used when usage of the first communication channel drops, e.g. when the streaming bandwidth is reduced.

According to a fourth step 340 data is sent to the client via the second communication channel. The data is generated at the server and sent to the client. The data may be generated in response to detecting that the streaming bandwidth is below a predetermined threshold. Data includes one or more residuals comprising information suitable to improve the image at the client, plus control information which provides information on how the residual data can be combined with the image data at the client.

Figure 4:
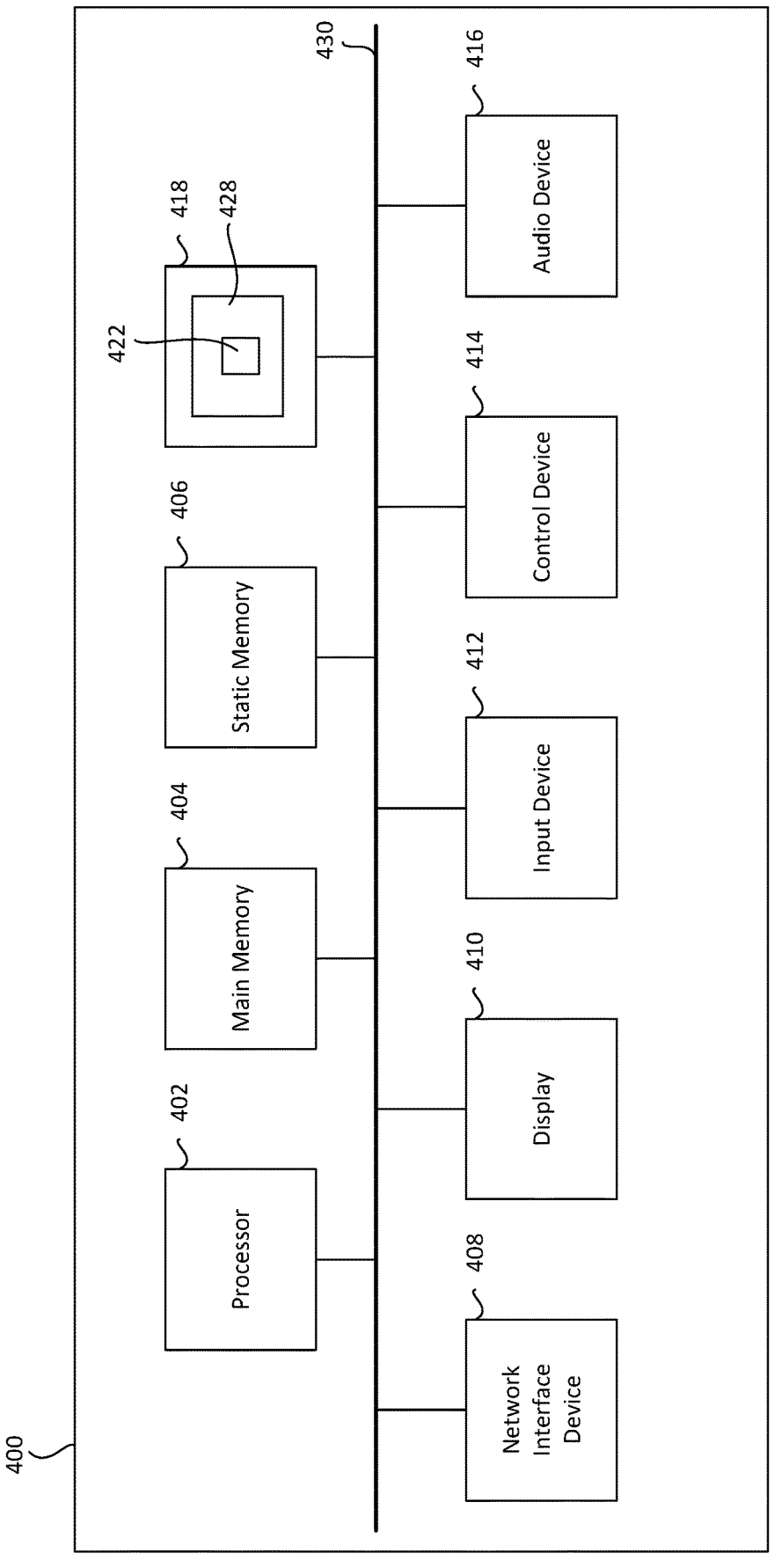
FIG. 4 illustrates a block diagram of one example implementation of a computing device.

FIG. 4 illustrates a block diagram of one example implementation of a computing device 400 that can be used for implementing the steps indicated in FIG. 3 and as explained throughout the detailed description. The computing device is associated with executable instructions for causing the computing device to perform any one or more of the methodologies discussed herein. The computing device 400 may operate in the capacity of the data model or one or more computing resources for implementing the data model for carrying out the methods of the present disclosure. In alternative implementations, the computing device 400 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment.

The example computing device 400 includes a processing device 402, a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a secondary memory (e.g., a data storage device 418), which communicate with each other via a bus 430.

Processing device 402 represents one or more general-purpose processors such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic (instructions 422) for performing the operations and steps discussed herein.

The computing device 400 may further include a network interface device 408. The computing device 400 also includes a video display unit 410 (e.g., a liquid crystal display (LCD) or a cathode ray tube (CRT)), an alphanumeric input device 412 (e.g., a keyboard or touchscreen), a cursor control device 414 (e.g., a mouse or touchscreen), and an audio device 416 (e.g., a speaker).

The data storage device 418 may include one or more machine-readable storage media (or more specifically one or more non-transitory computer-readable storage media) 428 on which is stored one or more sets of instructions 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the disclosure has been described with reference to specific example implementations, it will be recognised that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method comprising:
transmitting, by a server, an image stream to a client device, wherein the transmitting comprises sending an encoded version of a particular image frame to a client device via a first communication channel between the server and the client device;
detecting, by the server, a reduced streaming bandwidth of the first communication channel;
determining, by the server, that the image stream is paused at the client device while the encoded version of the particular image frame is displayed at the client device;
in response to determining that the image stream is paused at the client device while the encoded version of the particular image frame is displayed at the client device, obtaining, by the server, data that enhances an image quality of the encoded version of the particular image frame to be sent to the client device via a second communication channel, wherein the second communication channel is separate to the first communication channel and wherein the data relates to the particular image frame; and
transmitting, by the server, the data that enhances the image quality of the encoded version of the particular image frame to the client device via the second communication channel.

2. The computer-implemented method of claim 1, wherein detecting a reduced streaming bandwidth of the first communication channel comprises detecting, by the server, a streaming bandwidth of the first communication channel does not satisfy a threshold value.

3. The computer-implemented method of claim 1, wherein detecting a reduced streaming bandwidth of the first communication channel comprises receiving, by the server and from the client device, a signal indicating a user pressed a pause button to freeze the image stream on a display on a client device.

4. The computer-implemented method of claim 1, wherein determining that the image stream is paused at the client device while the encoded version of the particular image frame is displayed at the client device comprises determining, by the server, that the encoded version of the particular image frame displayed at the client device is static according to at least one of the reduced streaming bandwidth of the first communication channel or a signal received from the client device.

5. The computer-implemented method of claim 1, wherein obtaining data that enhances an image quality of the encoded version of the particular image frame to be sent to the client device via a second communication channel comprises:
determining, by the server, a plurality of residual images based on a first resolution version of the particular image frame a second resolution version of the particular image frame, wherein the first resolution version is greater than the second resolution version, and the second resolution version of the particular image frame is a reconstructed version of the particular image frame that is reconstructed at the client device.

6. The computer-implemented method of claim 5, wherein the plurality of residual images is applied at the client device to progressively improve the particular image frame that is displayed at the client device.

7. The computer-implemented method of claim 5, wherein transmitting the data that enhances the image quality of the encoded version of the particular image frame to the client device via the second communication channel comprises transmitting, by the server and to the client device, the plurality of residual images in an order of descending improvement to the particular image frame that is displayed at the client device.

8. A system comprising:
one or more computers and one or more storage devices on which are stored instructions that are operable, when executed by the one or more computers, to cause the one or more computers to perform operations comprising:
transmitting, by a server, an image stream to a client device, wherein the transmitting comprises sending an encoded version of a particular image frame to a client device via a first communication channel between the server and the client device;
detecting, by the server, a reduced streaming bandwidth of the first communication channel;
determining, by the server, that the image stream is paused at the client device while the encoded version of the particular image frame is displayed at the client device;
in response to determining that the image is stream is paused at the client device while the encoded version of the particular image frame is displayed at the client device, obtaining, by the server, data that enhances an image quality of the encoded version of the particular image frame to be sent to the client device via a second communication channel, wherein the second communication channel is separate to the first communication channel and wherein the data relates to the particular image frame;
transmitting, by the server, the data that enhances the image quality of the encoded version of the particular image frame to the client device via the second communication channel.

9. The system of claim 8, wherein detecting a reduced streaming bandwidth of the first communication channel comprises detecting, by the server, a streaming bandwidth of the first communication channel does not satisfy a threshold value.

10. The system of claim 8, wherein detecting a reduced streaming bandwidth of the first communication channel comprises receiving, by the server and from the client device, a signal indicating a user pressed a pause button to freeze the image stream on a display on the client device.

11. The system of claim 8, wherein determining that the image stream is paused at the client device while the encoded version of the particular image frame is displayed at the client device comprises determining, by the server, that the encoded version of the particular image frame displayed at the client device is static according to at least one of the reduced streaming bandwidth of the first communication channel or a signal received from the client device.

12. The system of claim 8, wherein obtaining data that enhances an image quality of the encoded version of the particular image frame to be sent to the client device via a second communication channel comprises:

determining, by the server, a plurality of residual images based on a first resolution version of the particular image frame a second resolution version of the particular image frame, wherein the first resolution version is greater than the second resolution version, and the second resolution version of the particular image frame is a reconstructed version of the particular image frame that is reconstructed at the client device.

13. The system of claim 12, wherein the plurality of residual images is applied at the client device to progressively improve the particular image frame that is displayed at the client device.

14. The system of claim 12, wherein transmitting the data that enhances the image quality of the encoded version of the particular image frame to the client device via the second communication channel comprises transmitting, by the server and to the client device, the plurality of residual images in an order of descending improvement to the particular image frame that is displayed at the client device.

15. One or more non-transitory computer storage media encoded with computer program instructions that when executed by one or more computers cause the one or more computers to perform operations comprising:

transmitting, by a server, an image stream to a client device, wherein the transmitting comprises sending an encoded version of a particular image frame to a client device via a first communication channel between a server and the client device;

detecting, by the server, a reduced streaming bandwidth of the first communication channel;

determining, by the server, that the image stream is paused at the client device while the encoded version of the particular image frame is displayed at the client device;

in response to determining that the image is stream is paused at the client device while the encoded version of the particular image frame is displayed at the client device, obtaining, by the server, data that enhances an image quality of the encoded version of the particular image frame to be sent to the client device via a second communication channel, wherein the second communication channel is separate to the first communication channel and wherein the data relates to the particular image frame;

transmitting, by the server, the data that enhances the image quality of the encoded version of the particular image frame to the client device via the second communication channel.

16. The one or more non-transitory computer storage media of claim 15, wherein detecting a reduced streaming bandwidth of the first communication channel comprises detecting, by the server, a streaming bandwidth of the first communication channel does not satisfy a threshold value.

17. The one or more non-transitory computer storage media of claim 15, wherein detecting a reduced streaming bandwidth of the first communication channel comprises receiving, by the server and from the client device, a signal indicating a user pressed a pause button to freeze the image stream on a display on the client device.

18. The one or more non-transitory computer storage media of claim 15, wherein determining that the image stream is paused at the client device while the encoded version of the particular image frame is displayed at the client device comprises determining, by the server, that the encoded version of the particular image frame displayed at the client device is static according to at least one of the reduced streaming bandwidth of the first communication channel or a signal received from the client device.

19. The one or more non-transitory computer storage media of claim 15, wherein obtaining data that enhances an image quality of the encoded version of the particular image frame to be sent to the client device via a second communication channel comprises:

determining, by the server, a plurality of residual images based on a first resolution version of the particular image frame a second resolution version of the particular image frame, wherein the first resolution version is greater than the second resolution version, and the second resolution version of the particular image frame is a reconstructed version of the particular image frame that is reconstructed at the client device.

20. The one or more non-transitory computer storage media of claim 19, wherein the plurality of residual images is applied at the client device to progressively improve the particular image frame that is displayed at the client device.

* * * * *